June 25, 1929.    A. C. BROWN    1,718,730
FAUCET HANDLE
Filed July 3, 1926
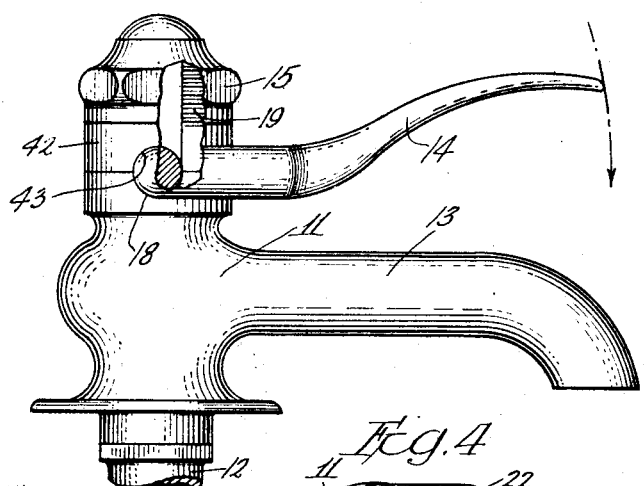
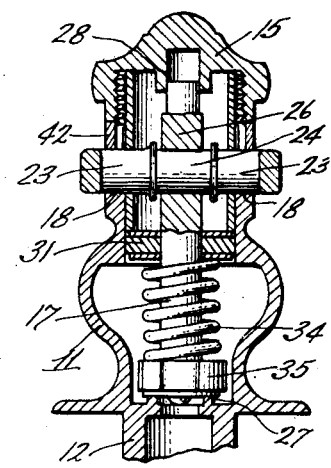
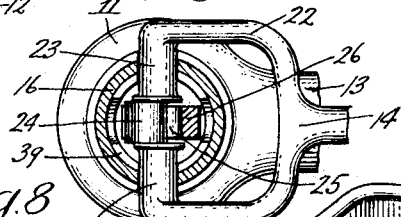
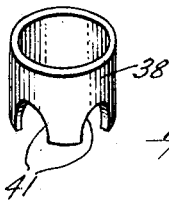
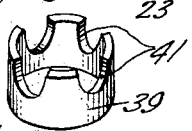
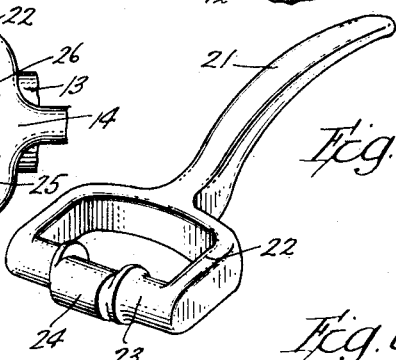
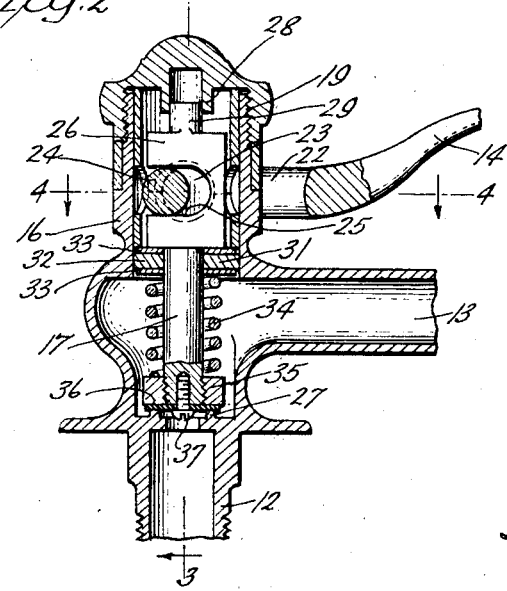
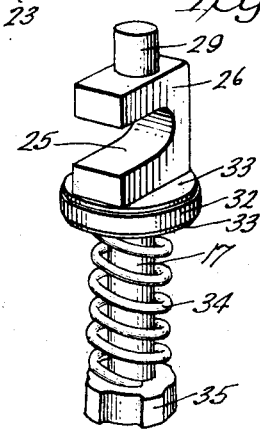
Inventor
Albert C. Brown
By Munday, Clarke & Carpenter
Attys Patented June 25, 1929.

1,718,730

UNITED STATES PATENT OFFICE.

ALBERT C. BROWN, OF CHICAGO, ILLINOIS.

FAUCET HANDLE.

Application filed July 3, 1926. Serial No. 120,312.

This invention relates in general to faucets and more particularly to faucets arranged for operation by handles and the like that may be depressed or raised for opening the faucet to cause fluid flow therethrough and has for an object the provision of such a faucet having a small, neat appearing, and strong handle.

Another important object of the invention is to provide a one piece handle that may be made of drop forgings or the like, and that will, therefore, be more durable than devices of this type provided heretofore.

Another important object of the invention is to provide a faucet that is adapted to receive a one piece handle and that will completely embrace the bearing portions of the handle and prevent escape of fluid through the top of the faucet.

Another important object is to provide a faucet that may be economically manufactured without reducing the service qualities of the faucet.

Numerous other objects and advantages of the invention will be apparent as it is better understood from the following description, which, taken in connection with the accompanying drawings, discloses a preferred embodiment thereof.

Referring to the drawings,

Figure 1 is an elevational view of a faucet embodying my invention.

Fig. 2 is a vertical section of the device shown in Fig. 1 and showing details of construction.

Fig. 3 is a section taken substantially on line 3—3 of Fig. 2.

Fig. 4 is a section taken substantially on line 4—4 of Fig. 2.

Fig. 5 is a perspective view of a preferred form of faucet handle.

Fig. 6 is a perspective view of a valve plunger; and

Figs. 7 and 8 are perspective views of the parts of a split bushing.

While my invention is equally applicable to any valve, faucet or like device that is adapted for controlling the flow of water or other fluids, I have shown a faucet 11 having an extended portion 12 formed for connection to pipes or other suitable conductors for admitting fluid to the faucet and an outlet nozzle 13 for discharging fluid from the faucet, a handle 14 and a device 15 for securing the handle and other valve parts to be later described in operable relation.

The body 11 is provided with a substantially cylindrical portion 16 extending therefrom in which a reciprocating and preferably vertically disposed plunger 17 may be positioned to control the fluid flow through the faucet. The cylindrical portion 16 of the valve body is cut away or slotted to provide a support or seat 18 for the handle 14 and extended to provide a threaded portion 19. The handle 14, in accordance with the preferred construction, includes a manipulating handle or portion 21, a yoke portion 22 arranged to embrace the cylindrical portion in the valve body, and a portion 23 formed to extend through the cylindrical portion 16 and to have a bearing in the seat 18. The portion 23 of the handle 14 is also suitably formed intermediate the ends thereof to actuate the plunger 17. While this may be accomplished in any suitable manner, I prefer to form an eccentric 24 in the portion 23 for engaging in a slot 25 in a yoke portion 26 of the plunger 17, so that by rotation of the portion 23 of the handle the plunger will be accordingly raised or lowered to or from a valve seat 27 and thereby control the flow of fluid. The device 15 may be any suitable device and in the present instance I have shown a nut having threaded engagement with the threaded portion 19 of the faucet body. This nut is preferably formed to provide a bearing 28 for an extended portion 29 of the plunger 17, the plunger 17 having an additional bearing in the cylindrical portion 16 of the faucet body through a collar 31 formed of a washer 32 of packing material and a pair of metal washers 33 disposed at each side of the washer 32, the packing washer 32 being of sufficient size to fit smoothly within the cylindrical portion 16 in the valve body. A spring 34 is positioned over the plunger 17 and seats against one of the washers 33 and a valve head 35, to which a valve gasket 36 of suitable material is or may be attached by means of a screw 37 or the like for providing a tight seal when the faucet is closed. A split bushing including parts 38 and 39 (Figs. 7 and 8) is or may be positioned within the cylindrical portion 16 of the faucet body. This bushing is provided to assist the nut or device 15 in securing the portion 23 of the valve handle during operation and to provide a seat for the washer 31 and spring 34. The bushing is split in a horizontal plane crossing the axis of the portion 23 of the handle 14 and the parts 38 and 39 are each formed as at 41 so as to embrace the portion 23 of the handle 14 when assembled thereover, so that the part 39 may be inserted before the handle and the part 38 may be assembled after the handle. A sleeve 42 that is formed substantially like the part 39 of the split bushing is preferably provided, which is cut away or notched as at 43 to embrace the upper half of the portion 23 of the handle 14 after assembly.

The plunger with the washer 31, the valve head 35 and spring 34 assembled thereto is inserted in the valve body, the part 39 of the split bushing is positioned over the plunger and the portion 23 of the handle 14 is inserted in the slot 25, and when so assembled the position of the handle through the eccentric 24 controls the position of the valve head 35, the portion 38 of the split bushing, the sleeve 42 and the nut or fastening device 15 are then assembled and the valve is held against the seat 27 by the spring 34 through the portion 23 of the valve handle and through the sleeve 42, the part 38 of the split bushing and the nut 15 engaging the threaded portion 19 of the cylindrical portion of the faucet body and upon rotation of the portion 23 of the handle 14, so as to shift the position of the eccentric and lift the plunger against the spring 34, fluid may pass through the faucet to be discharged or the like.

In the present instance I have shown a faucet handle arranged to actuate the plunger to pass water upon depression of the valve handle or motion of the handle in the direction of the arrow shown in dotted lines Fig. 1 and it will be understood that the direction of opening movement may be reversed if desired by shifting the eccentric 24 or by rearranging the plunger controlling means. It will also be noted that when the valve is assembled, as above described, there can be no passage of liquid or fluid through the top of the valve, since all space about the portion 23 of the handle 14 is closed.

It is thought that the invention and many of its attendant advantages will be understood from the foregoing description, and it will be apparent that various changes may be made in the form, construction and arrangement of the parts, without departing from the spirit and scope of the invention, or sacrificing all of its material advantages the form hereinbefore described being merely a preferred embodiment thereof.

I claim:

1. A forged one piece faucet handle, comprising a shaft having an offset central part for engagement with a valve stem, forwardly extending arms from the ends of said shaft and arranged for position outside the faucet body, a cross connecting part between the ends of said arms remote from the shaft, and a manipulating handle extending out from the center of said cross connecting part, all of forged integral construction.

2. A faucet, comprising a faucet body having an outlet spout extending from its side, a forged one piece faucet handle having a shaft extending through the faucet body and having an offset part in engagement with said valve, arms extending from the ends of said shaft and outside the body forwardly toward the outlet spout, a cross connection between said arms above said spout, and a manipulating handle extending from the said cross piece above and movable down toward the offset part for manipulation of the valve.

ALBERT C. BROWN.